(12) United States Patent
Shiohara

(10) Patent No.: US 7,522,208 B2
(45) Date of Patent: Apr. 21, 2009

(54) ELECTRONIC EQUIPMENT AND DIGITAL CAMERA

(75) Inventor: Ryuichi Shiohara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 583 days.

(21) Appl. No.: 11/076,041

(22) Filed: Mar. 10, 2005

(65) Prior Publication Data

US 2005/0237412 A1   Oct. 27, 2005

(30) Foreign Application Priority Data

Mar. 10, 2004 (JP) ............ P 2004-067353
Mar. 10, 2004 (JP) ............ P 2004-067394

(51) Int. Cl.
*H04N 5/222* (2006.01)
*H04N 5/225* (2006.01)

(52) U.S. Cl. ............ 348/333.06; 348/333.11; 348/375

(58) Field of Classification Search ............ 348/333.06, 348/333.11
See application file for complete search history.

(56) References Cited

U.S. PATENT DOCUMENTS 5,794,086 A * 8/1998 Wakabayashi et al. ...... 396/284
6,510,287 B1 * 1/2003 Tsukahara et al. .......... 396/281
6,850,271 B1 * 2/2005 Ichikawa ................. 348/207.2
7,321,395 B2 * 1/2008 Gotanda .................... 348/370
7,362,367 B2 * 4/2008 Soga ...................... 348/333.03

FOREIGN PATENT DOCUMENTS

| JP | 07-121771 A | 5/1995 |
| JP | 11-327721 A | 11/1999 |
| JP | 2001-108057 A | 4/2001 |
| JP | 2001-177758 A | 6/2001 |
| WO | WO 98/51073 A1 | 11/1998 |

* cited by examiner

Primary Examiner—David L Ometz
Assistant Examiner—Luong T Nguyen
(74) Attorney, Agent, or Firm—Sughrue Mion, PLLC

(57) ABSTRACT

A digital camera having a color image sensor, an optical system, a rotatable first switch, and a second switch that switches between various modes. The second switch indicates an intermediate point corresponding to the photograph mode, a first point corresponding to the first setting mode, or a second point corresponding to the second setting mode. A first setting unit sets a first processing condition relating to a white balance of an image according to a rotation angle of the first switch in the first setting mode. A second setting unit sets a second processing condition relating to a data size of an image according to a rotation angle of the first switch in the second setting mode. Furthermore, a processing unit processes an output signal of the color image sensor according to a first processing condition and a second processing condition in the photograph mode.

1 Claim, 18 Drawing Sheets

ELECTRONIC EQUIPMENT AND DIGITAL CAMERA

BACKGROUND OF THE INVENTION

The present invention relates to electronic equipment such as digital camera, in particular, relates to HMI (Human Machine Interface) of electronic equipment.

Generally, electronic equipment, in which an arbitrary function is selected from functions displayed on a screen by moving a cursor up, down, right, and left by operating a cross key, and a process according to the selected function is carried out, is known. (For example, refer to patent documents 1 and 2). A cross key is used in a multitude of electronic equipment because it can select a number of functions in one controller.

On the other hand, a digital camera which uses a cross key and an LCD (liquid crystal display) as an HMI (Human Machine Interface) to set an image size, a white balance, an aperture, an exposure, an ISO film speed is known (for example, refer to patent document 3). In a menu operation with a cross key and an LCD, a number of items can be set with few switches by combining operations such as a menu call, selection of an item, and decision.

However, there is a problem that power consumption is high in an HMI which uses an LCD. In addition, a screen of an LCD has a visibility problem in bright outdoors. In addition, a design which is unique to electronic equipment like a cross key and an LCD sometimes is avoided by an enthusiast of a film camera. In addition, in the menu operation with a cross key and an LCD, it is necessary to perform operations of a menu call, selection, decision in a predetermined order so that to change setting such as a white balance quickly so as not to miss a shutter chance takes getting used to.

Patent Document 1:
Japanese Unexamined Patent Publication No. 11-327721.
Patent Document 2:
International Patent Publication No. WO98/51073.
Patent Document 3:
Japanese Unexamined Patent Publication No. 2001-177758.

SUMMARY OF THE INVENTION

An object of the present invention is to provide electronic equipment comprising an HMI controller with good operability instead of a cross key. Another object of the present invention is to provide a digital camera comprising an HMI with good operability and low power consumption.

In order to solve the aforesaid object, the invention is characterized by having the following arrangement.

(1) Electronic equipment comprising:
a display portion that includes a screen in which a menu is displayed;
a controller that is rotatable or pivotable around an axis and movable in a plurality of different positions in a axis direction;
an indicator that displays a position in the axis direction of the controller on the screen; and
a processor that carries out a processing according to a function that is selected according to a rotation or a pivot of the controller from selectable functions which changes according to a position in the axis direction of the controller.

(2) The electronic equipment according to (1), wherein the processor displays, on the screen, the selectable function according to a position in the axis direction of the controller.

(3) The electronic equipment according to (2), wherein the selectable function is displayed at a position near to a position on the screen on which the position of the controller is displayed by the indicator.

(4) The electronic equipment according to (3), wherein the processor displays an image showing accessible image data in a region of the screen, the region not overlapping the position of the controller or the selectable function.

(5) The electronic equipment according to (1), wherein the indicator displays the position of the controller in a region of the screen, the region being near to the controller.

(6) The electronic equipment according to (1), wherein the indicator does not display the position of the controller when the selectable function does not change according to a position of the axis direction of the controller.

(7) A digital camera comprising:
a color image sensor;
an optical system that forms an image of a subject on the color image sensor;
a rotatable first switch;
a second switch that switches a photograph mode, a first setting mode, and a second setting mode;
a first setting unit that sets a first processing condition relating to a white balance of an image according to a rotation angle of the first switch in the first setting mode;
a second setting unit that sets a second processing condition relating to a data size of an image according to a rotation angle of the first switch in the second setting mode;
a first indication needle that indicates the first processing condition;
a second indication needle that indicates the second processing condition; and
an output unit that outputs an image according to the first processing condition and the second processing condition based on an output signal of the color image sensor in the photograph mode.

(8) The digital camera according to (7), wherein the second switch is a lever.

(9) A digital camera comprising:
a color image sensor;
an optical system that forms an image of a subject on the color image sensor;
a rotatable first switch;
a second switch that switches a photograph mode and a setting mode;
a setting unit that sets a processing condition relating to a data size of an image according to a rotation angle of the first switch in the setting mode;
an indication needle that indicates the processing condition; and
an output unit that outputs an image according to the processing condition based on an output signal of the color image sensor in the photograph mode.

(10) The digital camera according to (9), wherein the second switch is a lever.

(11) A digital camera comprising:
a color image sensor;
an optical system that forms an image of a subject on the color image sensor;
a rotatable first switch;
a second switch that switches a photograph mode and a setting mode;
a setting unit that sets a processing condition relating to a white balance of an image according to a rotation angle of the first switch in the setting mode;
an indication needle that indicates the processing condition; and an output unit that outputs an image according to the processing condition based on an output signal of the color image sensor in the photograph mode.

(12) The digital camera according to (11), wherein the second switch is a lever.

BRIEF DESCRIPTION OF THE DRAWINGS

FIG. 18A shows a state in which the jog dial is attached. FIG. 18B shows a state without the jog dial. FIG. 18C shows a shaft.

DETAILED DESCRIPTION OF PREFERRED EMBODIMENTS

Embodiments according to the present invention will be described based on the figures as follows.

First Embodiment

Figure 2:
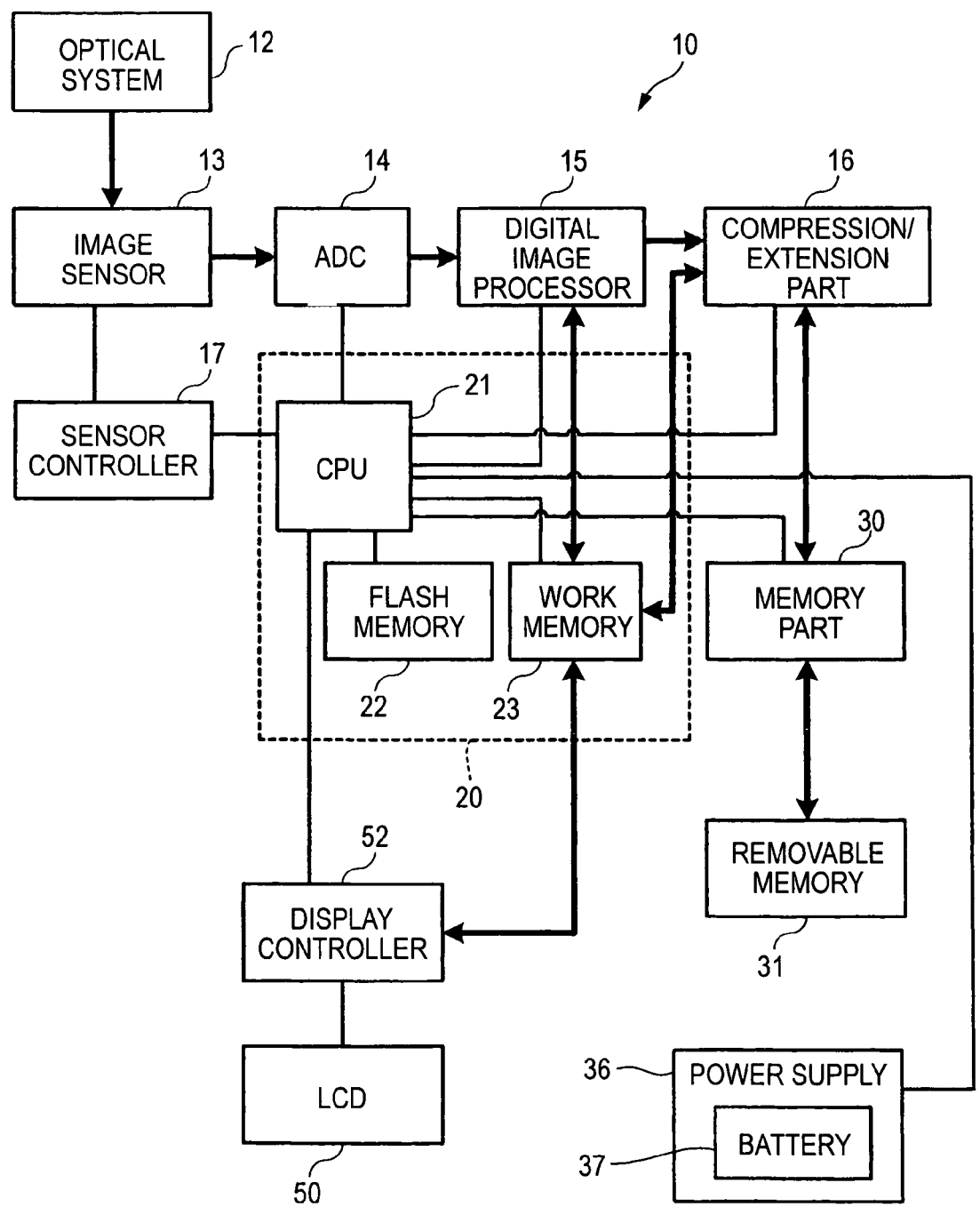
FIG. 2 is a block diagram according to the embodiment of the present invention.

FIG. 2 is a block diagram showing a hardware configuration of a digital still camera (DSC) 10 as electronic equipment according to a first embodiment of the present invention.

An optical system 12 comprises a lens and an aperture, and an optical image of a subject is formed on a receiving surface of an image sensor 13.

The image sensor 13 is an area image sensor which comprises a pixel positioned discretely in two-dimensional space and a charge-transfer device such as a CCD (Charge Coupled Device). The image sensor 13 accumulates electric charge, which is obtained by photoelectric conversion of the optical image imaged by the optical system 12, in every pixel in a fixed time period, and outputs an electrical signal in response to a received amount of light in every pixel. The image sensor 13 can take color image information by providing a four-colored complementary color filter of C (Cyan), M (Magenta), Y (Yellow), and G (Green), or a primary color filter of R (Red), G (Green), and B (Blue) on the receiving surface.

A/D converter (ADC) 14 quantizes an electrical signal outputted from the image sensor 13, and converts the electrical signal into a digital signal.

Digital image processor 15 performs image forming processing, white balance correction, gamma correction, color space conversion for the digital signal outputted from ADC 14, and makes image data showing a tone value of R, G, and B, and a tone value of Y, Cb, and Cr of each pixel.

A compression/extension part 16 compresses formed image data or extends compressed image data. Concretely, for example, the compression/extension part 16 compresses formed image data into JPEG format image data using an irreversible compression method that is an international standard. In addition, the compression method in the compression/extension part 16 may be a reversible compression method without truncating of data, or may be a method that does not compress data such as TIFF. In addition, the compression/extension part 16 may send out the image data (image data in Raw format) from the ADC 14 to a memory part 30 without performing image processing to the digital signal outputted from the ADC 14.

A control part 20 comprises a CPU 21, a flash memory 22, and a work memory 23. The control part 20 functions as a processor and an indicator mentioned in the Claims. The CPU 21 controls the whole of the DSC 10 by carrying out various programs stored in the flash memory 22. The flash memory 22 is a memory that stores various programs or data. Various programs and data to be stored in the flash memory 22 may be downloaded from a predetermined server through a network, or may be read from a storage medium that is able to be read from a computer such as a removable memory 31. The work memory 23 is a memory to store a program and data temporarily.

A memory part 30 comprises a card slot to connect the removable memory 31, and a memory controller. The memory part 30 is controlled by control part 20, and stores image data compressed by the compression/extension part 16 in a predetermined region of the removable memory 31. In addition, the memory part 30 is controlled by the control part 20, and reads image data stored in the removable memory 31.

A power supply 36 comprises a battery 37 and a control circuit, and is connected to each part electrically. The battery 37 supplies power to each part.

The appearance of the DSC 10 is described based on FIG. 3 next.

By performing a film advance operation by a film advance lever 40, a shutter charge to cause a mechanical shutter to make a photograph movement possible can be performed. By this operation, a shutter button 43 becomes possible to be pushed down.

The shutter button 43 is installed in a central part of a dial switch 42. When the shutter button 43 is pushed down, the shutter screen which is not illustrated opens only for the predetermined time, and an optical image of a subject is taken in by the image sensor 13.

The dial switch 42 is a switch to select a shutter speed or a kind of imaging condition.

The circumference of a needle-type display 44 installed in proximity to the dial switch 42 is a rotary dial, and exposure correction can be set from −2 EV to +2 EV in ⅓ EV increments. In the internal circumference side of the display 44, the number of remaining images that can be photographed, a plurality of correction modes of a white balance, and a plurality of compression rates are displayed. For a correction mode of a white balance, there are correction modes such as "auto mode," "day light (sunlight)," "cloudy sky," "incandescent lamp," "shade," "fluorescent lamp," and "mercury lamp." For compressibility, for example, compressibility of image data of a JPEG format can be selected from compressibility such as high compressibility, medium compressibility, and low compressibility. In addition, the currently selected item among items displayed on the internal circumference side of the display 44 is indicated by the indicator.

An LCD 50 as a display portion is controlled by a display controller 52 (refer to FIG. 2), and displays reproduction of the digital image that is already photographed and various setting menus. The display controller 52 comprises a frame buffer to store data for display for one image area of the LCD 50, and a display circuit to drive the LCD 50 based on the data for display stored in the frame buffer. In addition, a predetermined region of the work memory 23 may be used as the frame buffer.

An LCD button 53, a menu button 54, an enter button 55, and a cancel button 56 are installed at the right side of the LCD 50. By operating each button and a jog dial 60 together, various kinds of functions of the DSC 10 can be selected.

An optical finder 58 is used for a user to view the object.

Figure 3A:
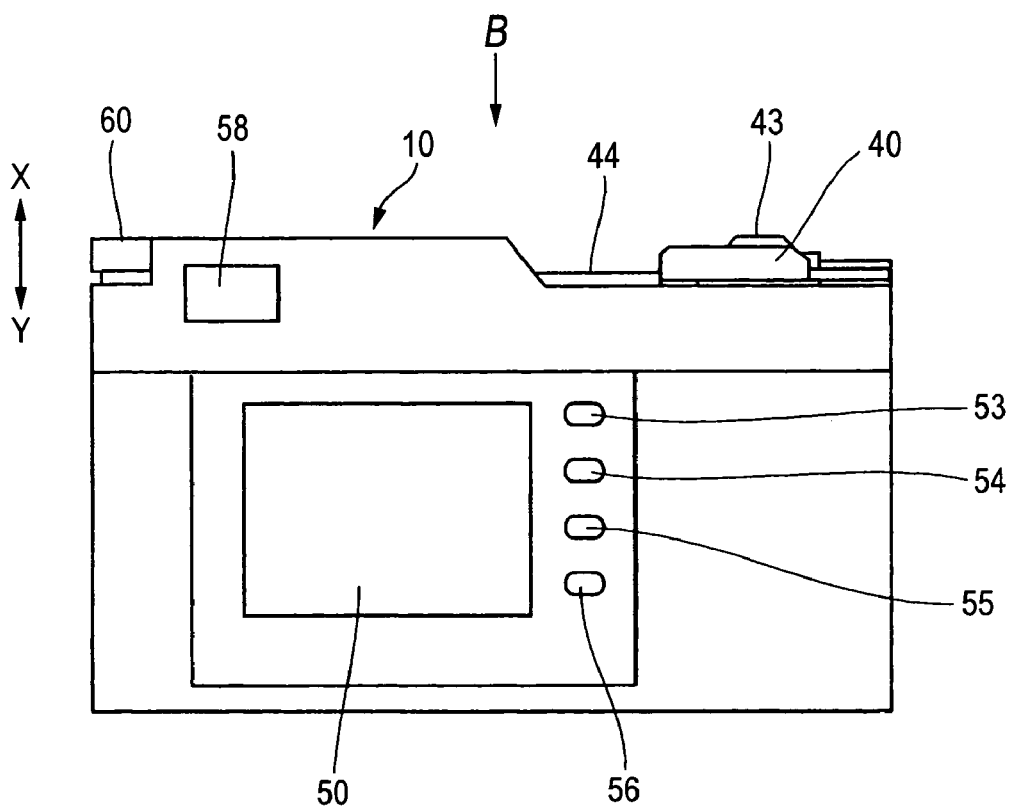
FIGS. 3A and 3B are plane views according to the embodiment of the present invention.
Figure 3B:
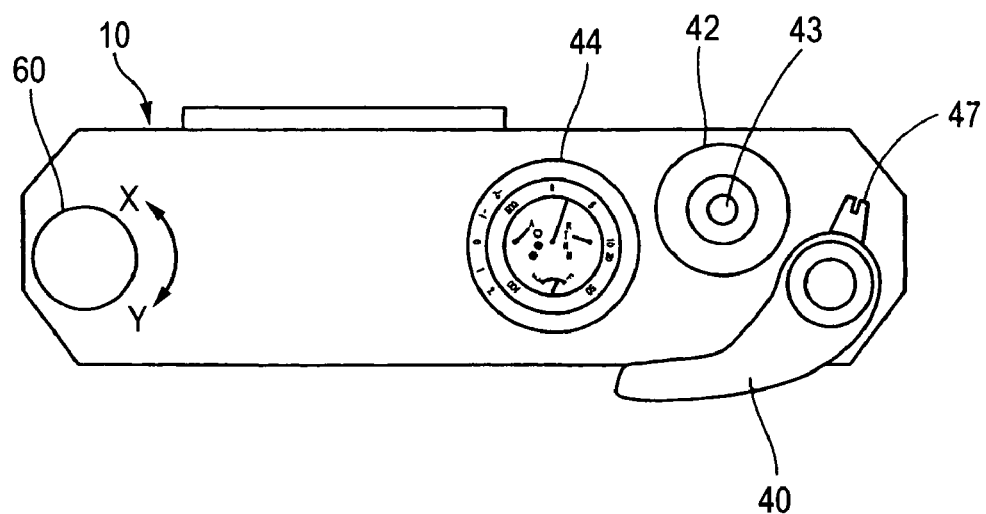
Figure 4A:
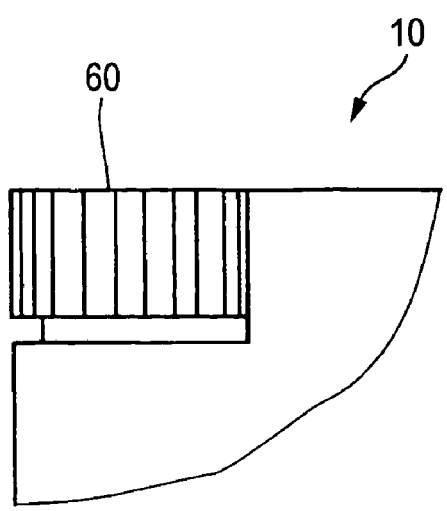
FIGS. 4A and 4B are schematic views according to the embodiment of the present invention.
Figure 4B:
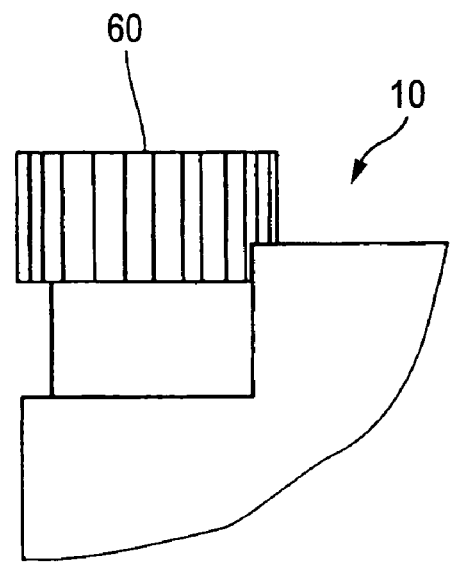
Figure 5A:
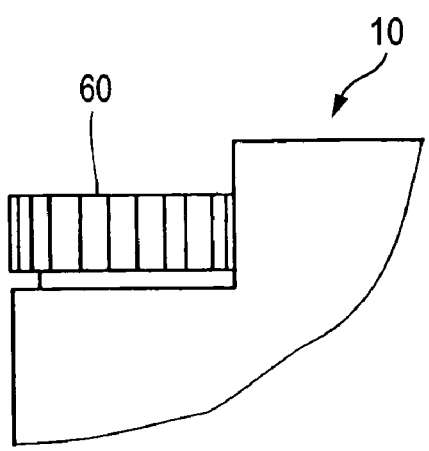
FIGS. 5A and 5B are schematic views according to the embodiment of the present invention.
Figure 5B:
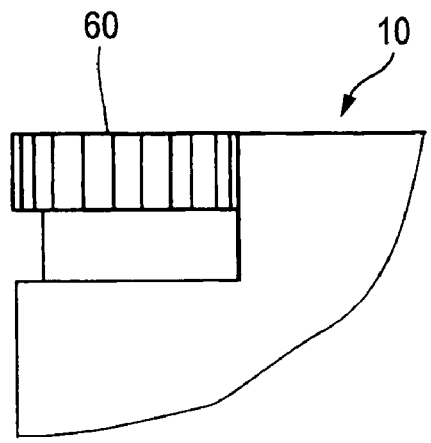
Figure 6A:
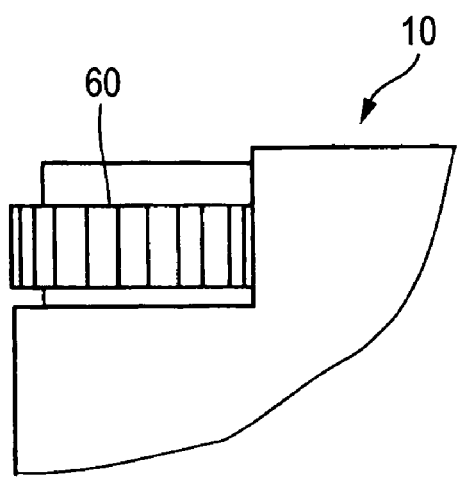
FIGS. 6A and 6B are schematic views according to the embodiment of the present invention.
Figure 6B:
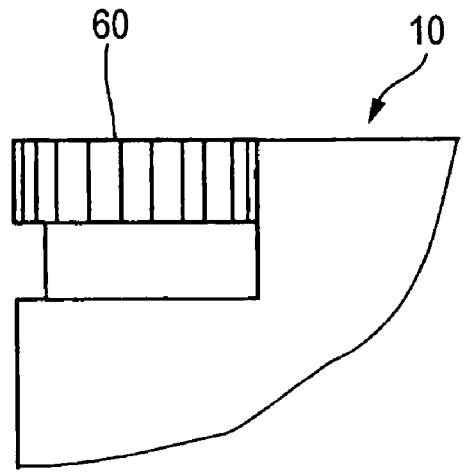
Figure 7A:
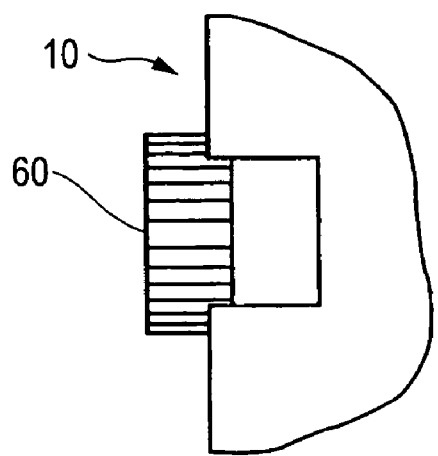
FIGS. 7A and 7B are schematic views according to the embodiment of the present invention.
Figure 7B:
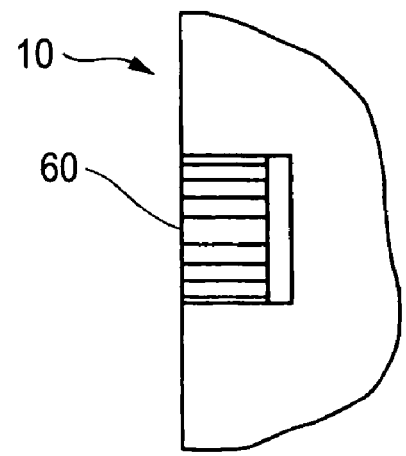

A jog dial 60 as a controller is able to rotate in the directions of arrows X and Y shown in FIG. 3B, and is able to move in the directions of the arrows X and Y shown in FIG. 3A which are axis directions of the jog dial 60. In other words, a position of the jog dial 60 can be changed to a lower position that is a home position (refer to 4A) or to an upper position (refer to 4B) to which the jog dial 60 is moved upward from the lower position, and the jog dial 60 is rotatable at the upper and lower positions. A rotation angle around the axis of the jog dial 60 and the upper and lower positions of the axis direction are detected with a sensor which is not illustrated. In addition, as shown in FIG. 5 and FIG. 6, the jog dial 60 does not need to project from the top surface of the DSC 10 in the upper position. In addition, the jog dial 60 is arranged at the side of the DSC 10 as shown in FIG. 7, and the jog dial 60 may be configured to be able to move to a right position and a left position. In addition, the jog dial 60 may be configured to be able to move to positions more than three positions such as an upper, a middle, and a lower position.

Figure 8:
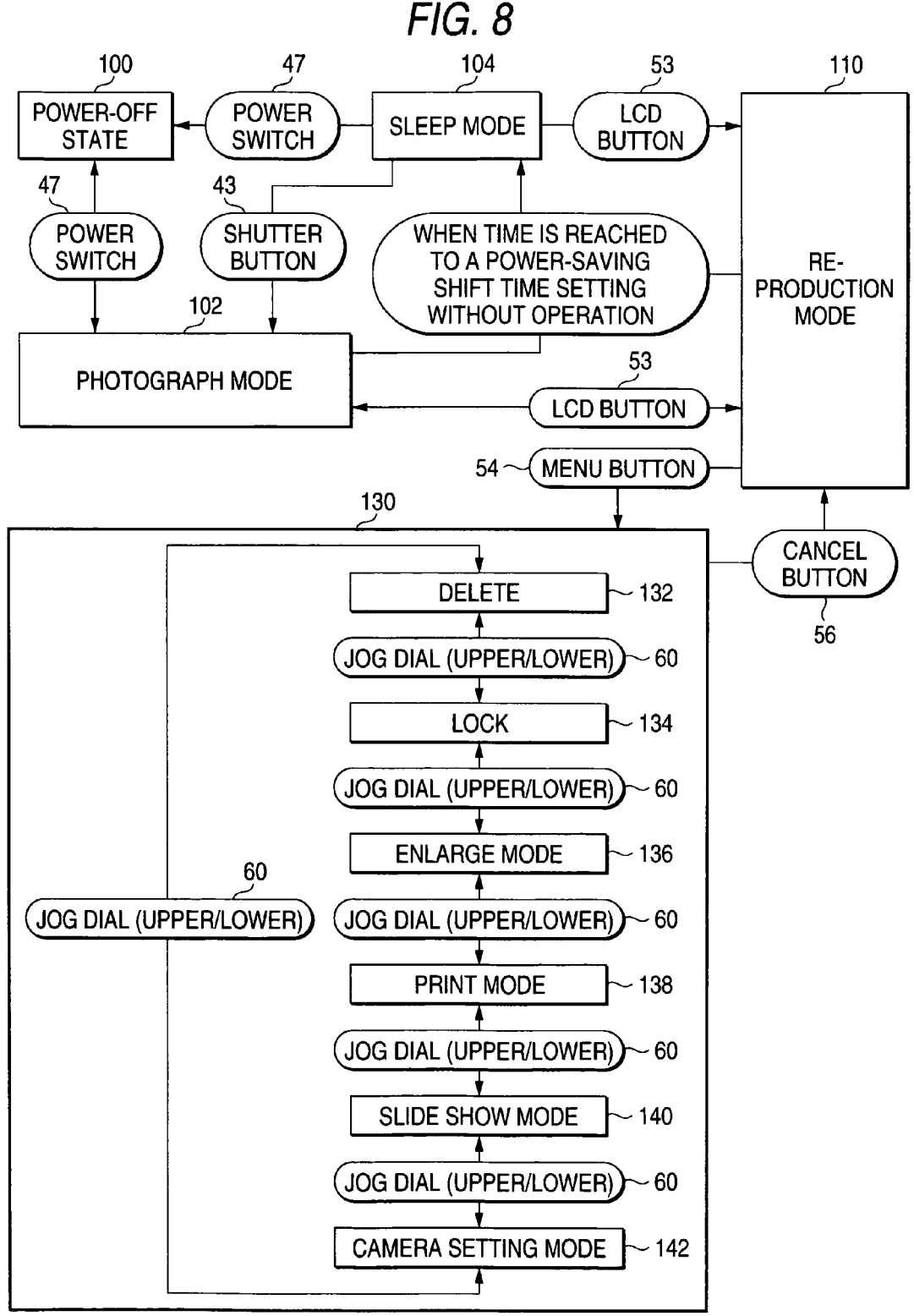
FIG. 8 is a schematic view according to the embodiment of the present invention.
Figure 9:
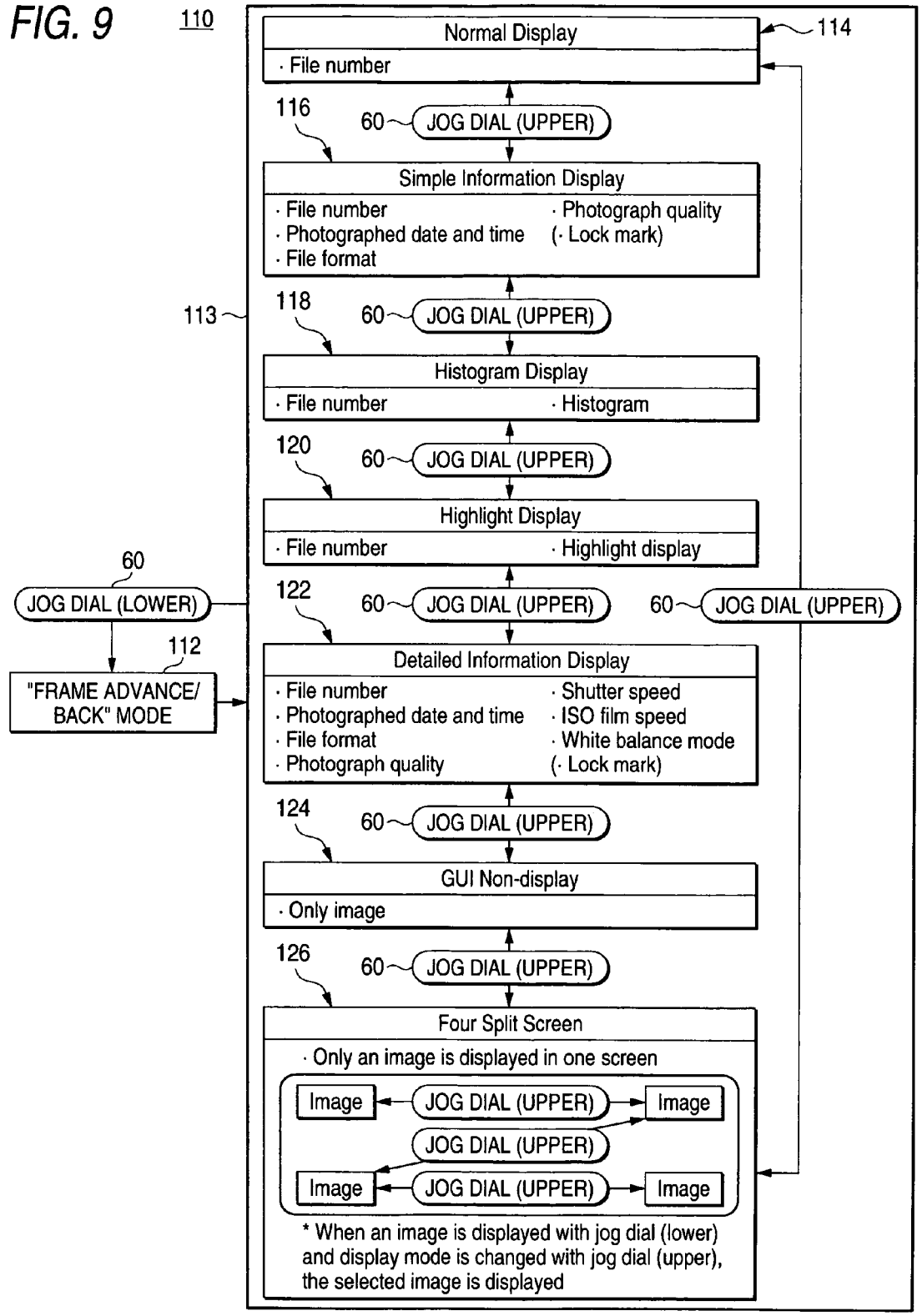
FIG. 9 is a schematic view according to the embodiment of the present invention.

FIG. 8 is a schematic view showing a shift of function modes of the DSC 10. FIG. 9 is a schematic view showing a shift of function modes in a reproduction mode 110.

When a power switch 47 is rotated to the power-on side with a power-off state 100, the mode shifts to a photograph mode 102. When the LCD button 53 is pushed in the photograph mode 102, the mode shifts to the reproduction mode 110. When time is reached to a predetermined setting of a power-saving shift time without operating the DSC 10 in the photograph mode 102 or the reproduction mode 110, the mode shifts to a sleep mode 104. In the sleep mode 104, the mode shifts to the power-off state 100 when the power switch 47 is turned off, and the mode shifts to the reproduction mode 110 when the LCD button 53 is turned on, and the mode shifts to the photograph mode 102 when the shutter button 43 is pushed. When the menu button 54 is pushed in the reproduction mode 110, the mode shifts to the main menu 130, and a menu is displayed on the LCD 50.

The reproduction mode 110 is a mode displaying an image stoned in the removable memory 31 on the LCD 50. As shown in FIG. 9, when the jog dial 60 is at the lower position in the reproduction mode 110, the mode is a "frame advance/back" mode 112, when the jog dial 60 is at the upper position the mode is a "read information" mode 113. When the jog dial 60 is turned to the "frame advance/back" mode 112, the image stored in the removable memory 31 is selected by a predetermined order, and the selected image is displayed on the LCD 50. In the "information reading" mode 113, detailed information of the selected image can be changed according to a rotation of the jog dial 60.

Figure 1:
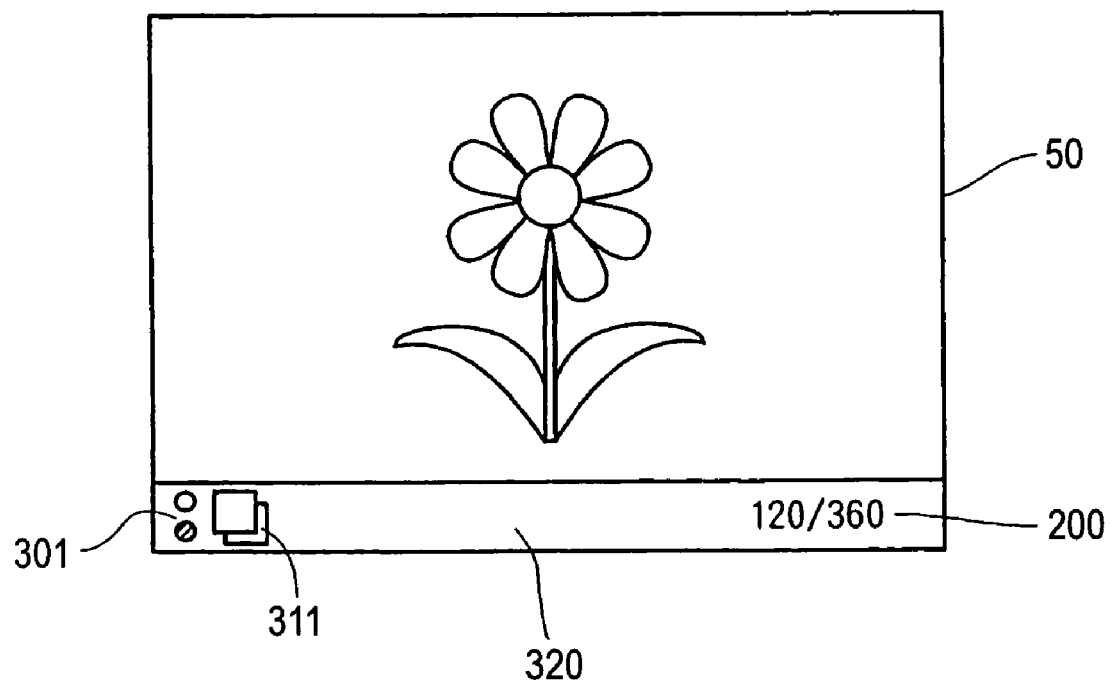
FIG. 1 is a schematic view showing a screen according to an embodiment of the present invention.

FIG. 1 is a schematic view showing a screen of the LCD 50 in the "frame advance/back" mode 112. FIG. 10, FIG. 11, and FIG. 12 are schematic views showing a screen of the LCD 50 in the "information reading" mode 113.

In the "frame advance/back" mode 112 and the "information reading" mode 113, position marks 301 and 302 are displayed on a region 320 with a predetermined width located in a bottom end of the screen of the LCD 50, and the image stored in the removable memory 31 is displayed on a region upward of the region 320. In addition, in the "frame advance/back" mode 112 and the "information reading" mode 113, detailed information of the image according to a display mode selected at the "information reading" mode 113 superimposes the image to be displayed. The display mode selectable in the "information reading" mode 113 will be mentioned later.

The position marks 301 and 302 are equivalent to the indicator mentioned in the Claims. The position marks 301 and 302 are displayed on a left end of the screen near to an arranged position of the jog dial 60. Because the displayed position of the position marks 301 and 302 are near to the arranged position of the jog dial 60, it is easy to recall that the position marks 301 and 302 display a position of the jog dial 60. The position marks 301 and 302 consist of two circles positioned up and down, and change according to a position of the axis direction of the jog dial 60. In addition, the position in the axis direction of the jog dial 60 may be displayed with an indicator comprising an LED provided near the screen of the LCD 50. In addition, the position marks 301 and 302 may be displayed on the upper left of the screen.

In the "frame advance/back" mode 112 in which the jog dial 60 is the lower position, as shown in FIG. 1, the position mark 301 in which the circle positioned lower is more out standing than the circle positioned upper is displayed. Concretely, for example, the lower circle is made larger than the upper circle, when a background of the region 320 is black, the inside of the upper circle is painted over with gray, and the inside of the lower circle is painted over with green. In addition, the mark to show the jog dial 60 is at the lower position may be a graphic symbol such as a triangular "V" with a vertex at the bottom, and may be a word such as "bottom."

In the "frame advance/back" mode 112 in which the jog dial 60 is at the lower position, an icon 311 is displayed at the right of the position mark 301 of the region 320. The icon 311 shows a function to switch an image to be displayed on the screen. In addition, replacing with the icon 311, a word or a symbol can be displayed to show the function to switch the image to be displayed on the screen.

The user can confirm that the jog dial 60 is at the lower position easily by checking the position mark 301. In particular, even if it is difficult to observe and confirm the controller directly because the use environment of the DSC 10 is dark, the position in the axis direction of the controller can be recognized easily if the LCD 50 is in an on state. By confirming the icon 311, a user can recognize easily that the frame advance or the frame back in order of images showing image data is possible.

In the "information reading" mode 113 in which the jog dial 60 is at the upper position, when the jog dial 60 is rotated, displayed detailed information about the selected image is replaced. In the "information reading" mode 113, the position mark 302 in which the circle positioned upper is more out standing than the circle positioned lower is displayed as shown in FIG. 11 and FIG. 12. Concretely, for example, the upper circle is made bigger than the lower circle, when the background of the region 320 is black, the inside of the lower circle is painted over with gray, and the inside of the upper circle is painted over with green. In addition, the mark to show the jog dial 60 is at the upper position may be a graphic symbol such as a triangular "Δ" with a vertex at the top, and may be a word such as "top."

In the "information reading" mode 113 in which the jog dial 60 is at the upper position, an icon 312 is displayed at the right of the position mark 302. The icon 312 shows a function to switch an image to be displayed on the screen. In addition, a word or a symbol can be displayed to show that the detailed information of the image displayed on the screen can be switched.

The "information reading" mode 113 is a general term of a plurality of display modes of a standard display 114, a simple information display 116, a histogram display 118, a highlight display 120, a detailed information display 122, a GUI non-display 124, and a four split screen 126 which are selected depending on the rotation angle of the jog dial 60. When the jog dial 60 is moved to the lower position in an arbitrary display node, the mode shifts to the "frame advance/back" mode 112 in which the detailed information according to an immediately preceding display mode is displayed.

The display modes which are selectable when the jog dial 60 is at the upper position will be described as follows.

Figure 10A:
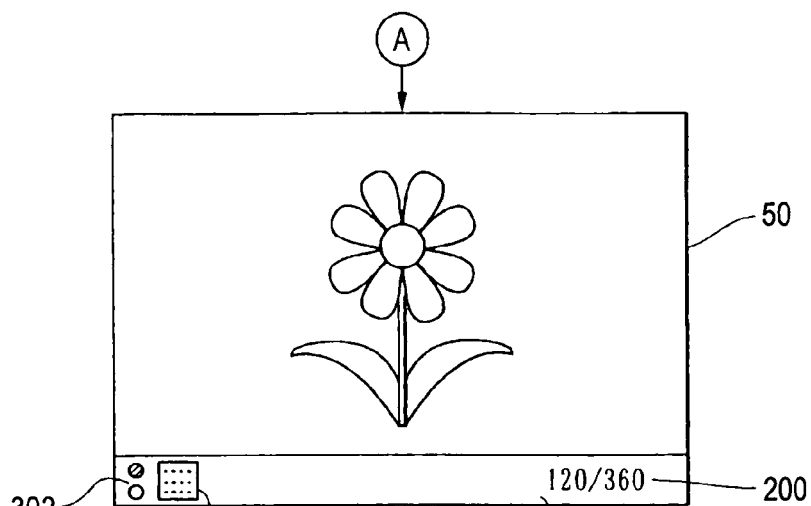
FIGS. 10A to 10C are schematic views showing a screen according to the embodiment of the present invention.
Figure 10B:
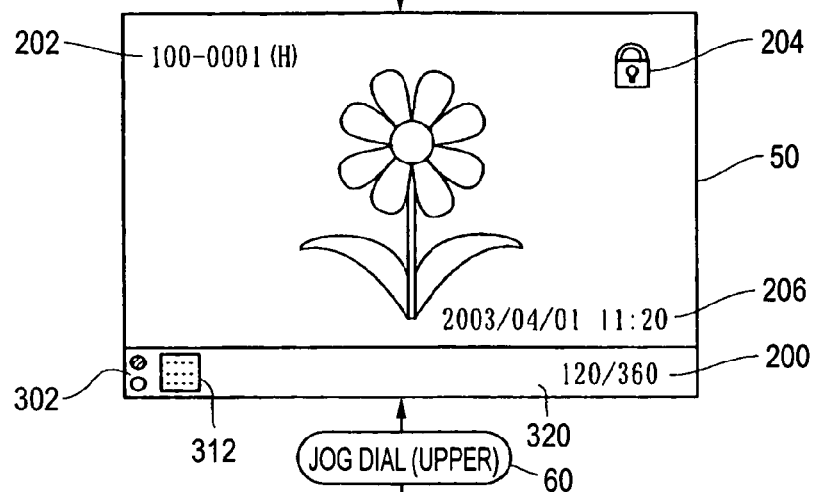
Figure 10C:
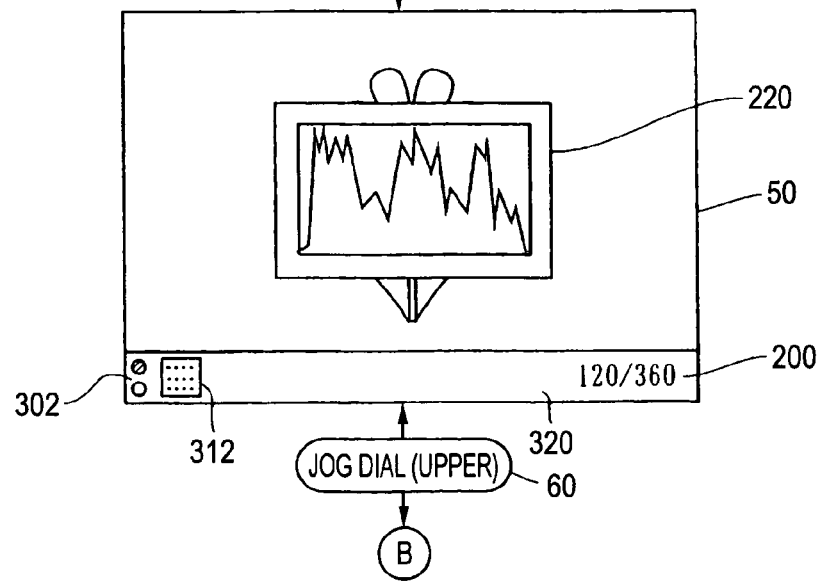
Figure 11A:
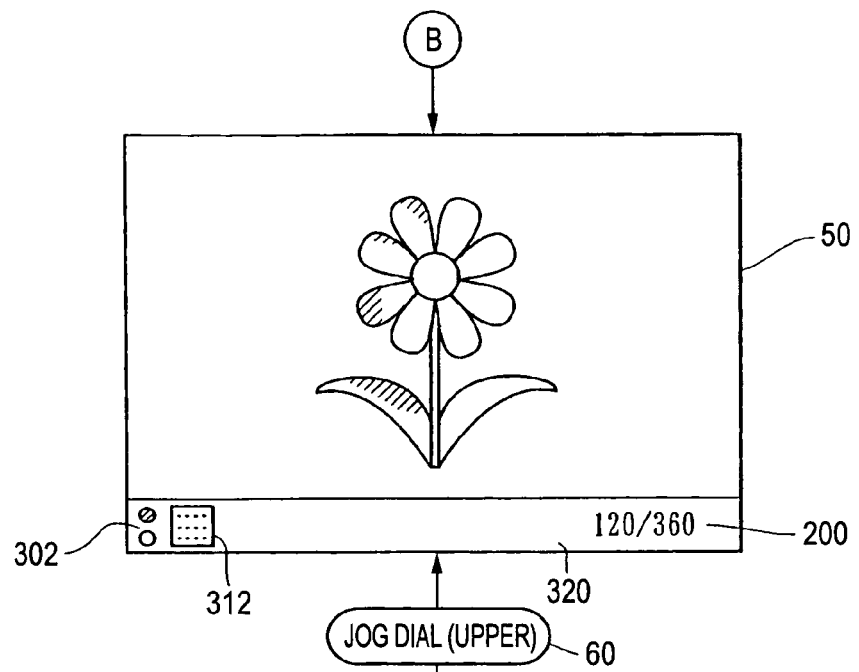
FIGS. 11A and 11B are schematic views showing the screen according to the embodiment of the present invention.
Figure 11B:
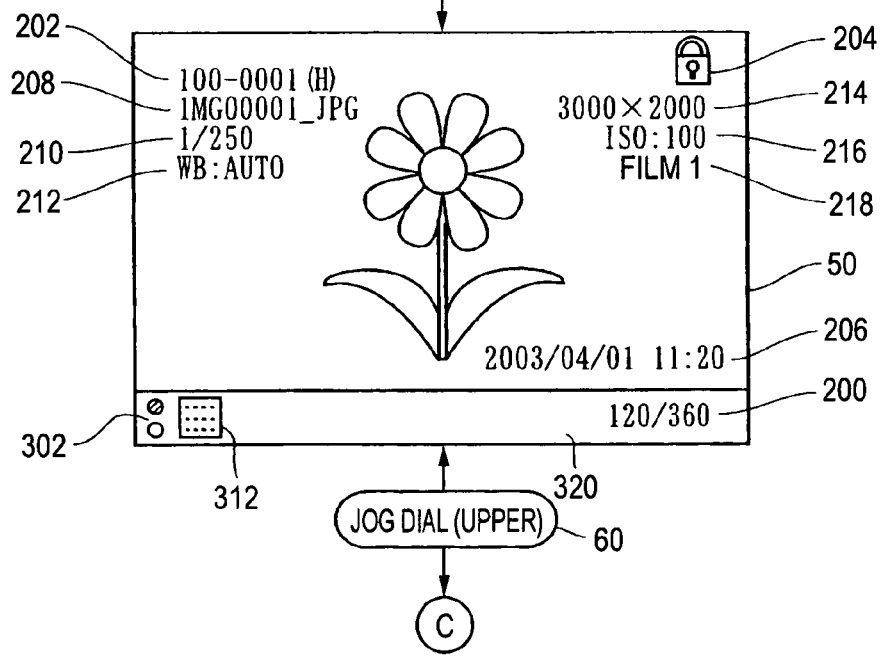
Figure 12A:
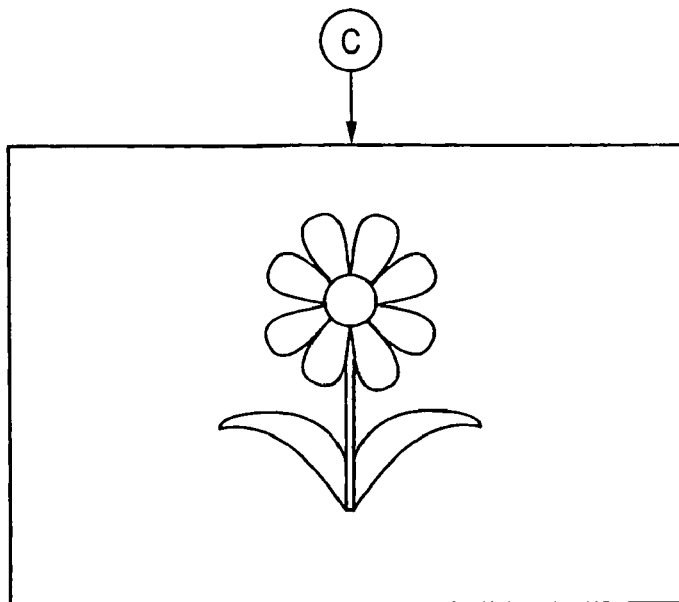
FIGS. 12A and 12B are schematic views showing the screen according to the embodiment of the present invention.
Figure 12B:
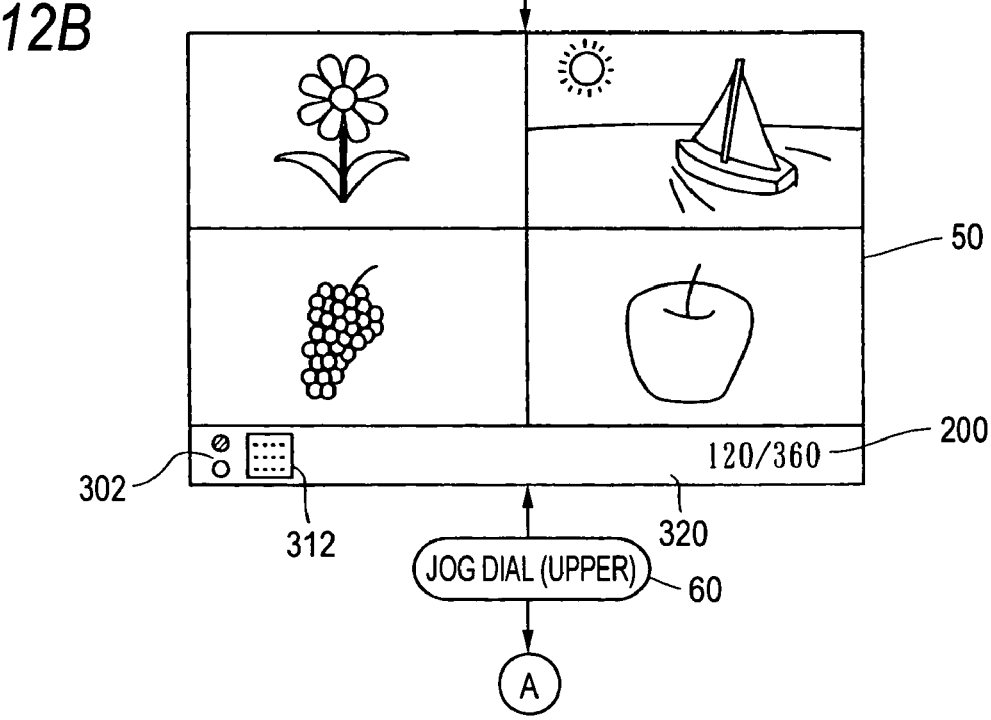

In the standard display 114, "the image number/the number of the total images" 200 is displayed at a region of the right end of the LCD 50 as shown in FIG. 10A. In the simple information display 116, a character string 202 showing a file number and photograph quality, a mark 204 showing whether deletion of a file is prohibited, photographed date and time 206 are displayed as shown in FIG. 10B. In the histogram display 118, a histogram 220 is displayed as shown in FIG. 10C. In the highlight display 120, a region with a white imbalance is displayed clearly on the image as shown in FIG. 11A. The region with the white imbalance is shown by hatching in FIG. 11A. In detailed information display 122, as shown in FIG. 11B, the character string 202 showing the file number and the photograph quality, the mark 204 showing whether file protection is applied, the photographed date and time 206, a file name 208, a shutter speed 210, a correction mode 212 of a white balance, a resolution 214, an ISO film speed 216, a film setting 218 are displayed. In the GUI non-display 124, as shown in FIG. 12A, the image stored in the removable memory 31 is displayed in a full display, and other information is not displayed at all. In the four split screen 126, images of four consecutive image numbers in which the beginning is an image number of the currently selected image are displayed in the four split screen as shown in FIG. 12B. When the jog dial 60 is rotated in the four split screen 126, a frame of the currently selected image is emphasized.

An operation of the jog dial 60 in the main menu 130 will be described next. During the operation of the main menu 130, selectable functions do not change regardless of whether the jog dial 60 is at the upper position or at the lower position.

Figure 13:
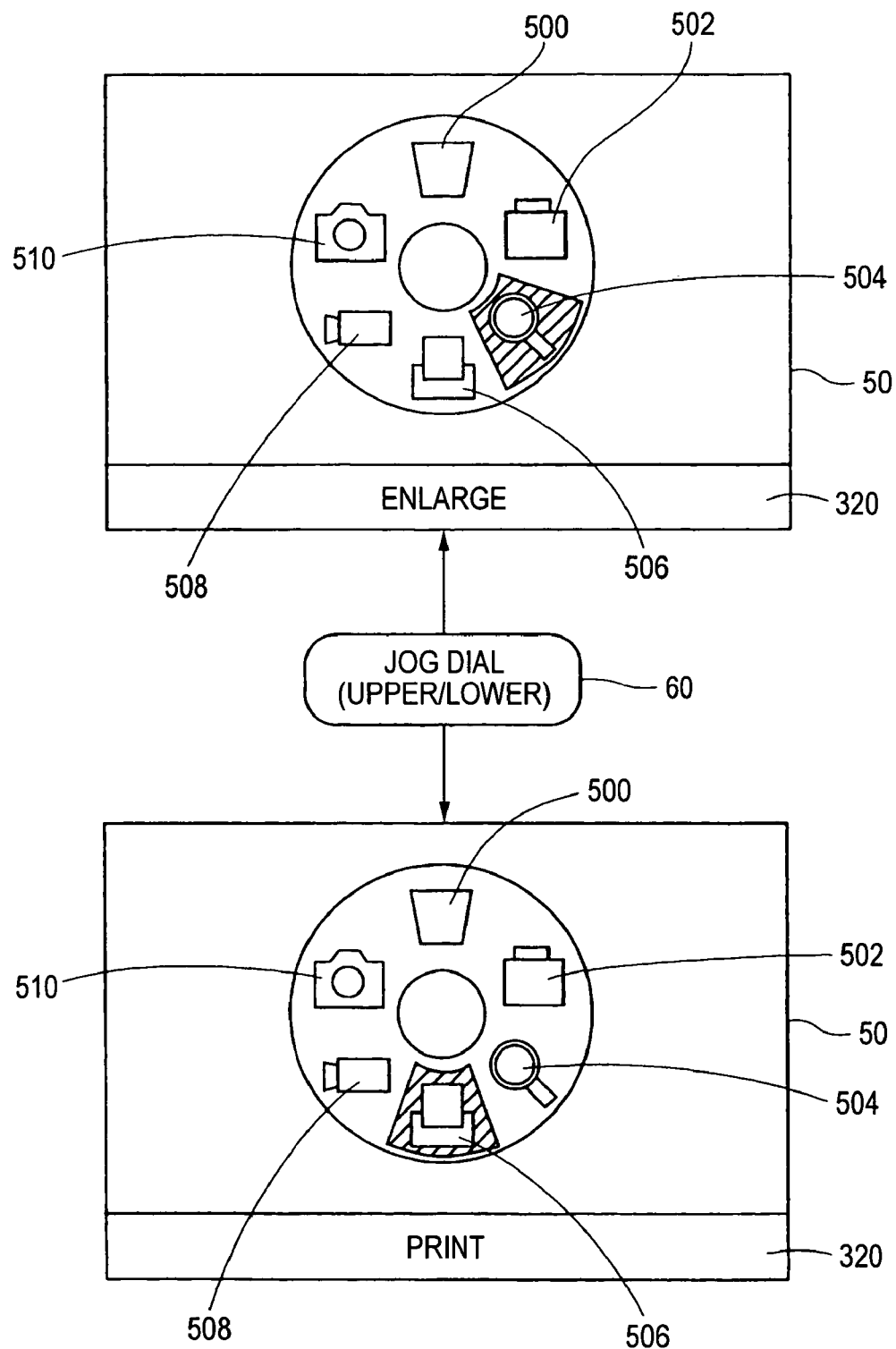
FIG. 13 is a schematic view showing the screen according to the embodiment of the present invention.

In the main menu 130, when the jog dial 60 is rotated, regardless of the upper or lower position of the jog dial 60, one of a delete mode 132, a lock mode 134, an enlarge mode 136, a print mode 138, a slide show mode 140, and a camera setting mode 142 can be selected. In the main menu 130, one of icons 500, 502, 504, 506, 508, and 510 corresponding to a selected mode is emphasized as shown in FIG. 13. In the main menu 130 in which the selectable functions do not change with the upper and lower positions of the jog dial 60, the position in the axis direction of the jog dial 60 is not displayed. By confirming that the position marks 301 and 302 displayed in the reproduction mode 110 are not displayed in a region of the left corner of the region 320 of the LCD 50, the user can recognize that the upper and lower positions of the jog dial 60 are unrelated to the operation in the main menu 130.

A function of each mode of the main menu 130 is simply described as follows.

The deletion mode 132 is a mode that decides whether the image data is deleted from the removable memory 31. The lock mode 134 is a mode in which the user decides whether deletion of the image data from the removable memory 31 is prohibited. The enlarge mode 136 is a mode in which the image is enlarged or reduced. The print mode 138 is a mode that decides whether the displayed image is printed. The slide show mode 140 is a mode in which images showing image data stored in the removable memory 31 are automatically displayed with frame advance sequentially. The camera setting mode 142 is a mode setting a monochrome display or a color display, a chroma, and a contrast. More detailed function choice in each mode of the main menu 130 described above is performed by a combination with various buttons including the jog dial 60.

According to the DSC 10 of one embodiment of the present invention described above, because when the jog dial 60 is moved to a position of upper and lower positions a selectable function can be changed, the user can select a desired function among various functions by the operation of the jog dial 60.

By confirming the position marks 301 and 302, the user can recognize the position in the axis direction of the controller easily.

A user can recognize contents of a selectable function with the jog dial 60 at the upper and lower positions by confirming the icon 311 and the icon 312. For example, if the icon 311 is confirmed, the user can recognize that the sequential frame advance or frame back display is possible. If the icon 312 is confirmed, the user can recognize that the display of detailed information of the image data is possible.

Because the position marks 301 and 302 and the icons 311 and 312 are displayed nearby, the position of the jog dial 60 and a selectable function can be grasped on the screen of the LCD 50 at the same time.

Because the region that the image recorded in the removable memory 31 is displayed and the region 320 that the position marks 301 and 302 and the icons 311 and the 312 are displayed are not overlapped, the upper or lower position of the jog dial 60 and a selectable function can be grasped while the user watches the whole image.

Because the position marks 301 and 302 are displayed at the left edge of the region 320 which is near to the arranged position of the jog dial 60 of the region 320, it is easy to recall that the position marks 301 and 302 show the position of the jog dial 60.

By confirming that the position marks 301 and 302 are not displayed at the left edge of the region 320, the user can recognize that the operation to move the upper and lower position of the jog dial 60 is meaningless even if the jog dial 60 is actually rotated in the axis direction and a selectable function at the upper and lower positions of the jog dial 60 is not confirmed.

In the first embodiment, the DSC 10 is used as an example of electronic equipment, but the present invention may be applied to an HMI of electronic equipment comprised of a television receiver and its controller, and a main body of music playback equipment and its controller. Concretely, for example, a remote controller of a television receiver comprises a jog dial 60 which can move to an axis direction, and a position of the axis direction of the jog dial 60 may be displayed on a screen of a television receiver.

Second Embodiment

Figure 15:
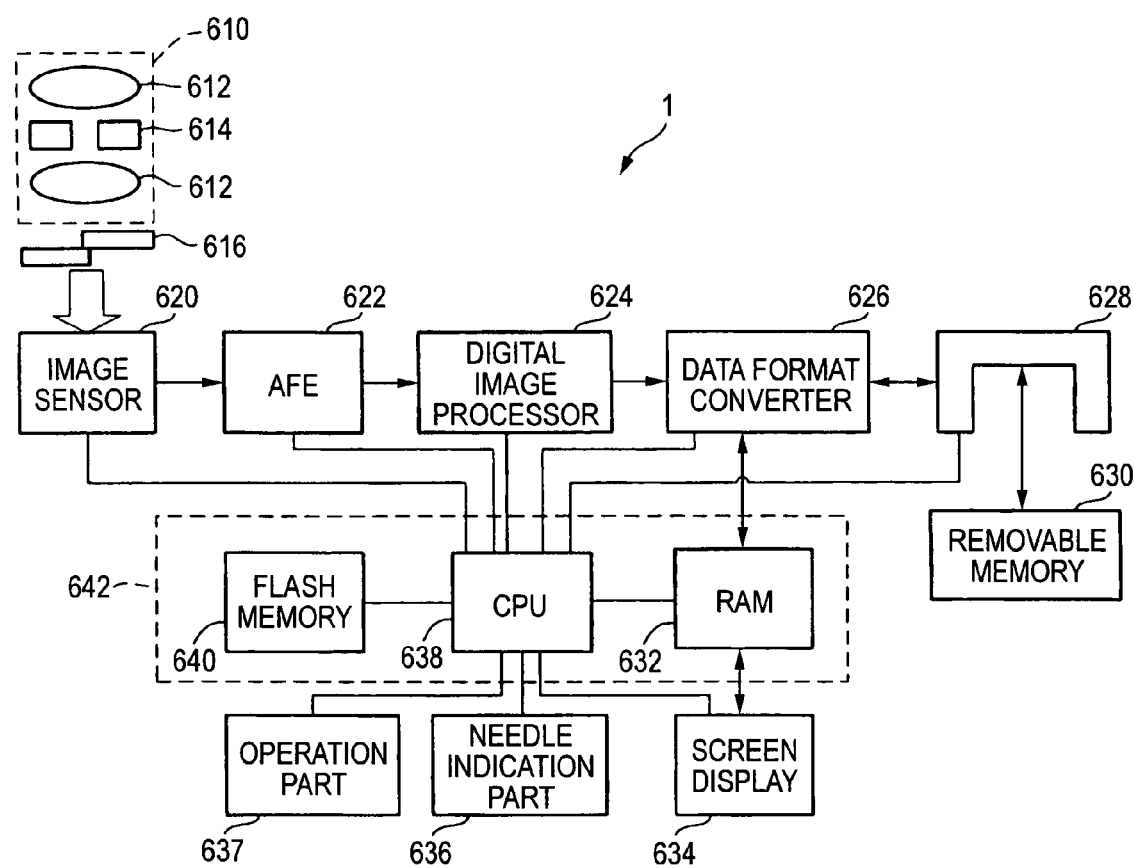
FIG. 15 is a block diagram showing a hardware construction of the digital camera according to the second embodiment of the present invention.

FIG. 15 is a block diagram showing a hardware configuration of a digital still camera (DSC) 601 as a digital camera according to a second embodiment of the present invention.

An optical system 610 comprises a plurality of lens 612 and an aperture 614. The optical system 610 forms an image of a subject on a receiving surface of an image sensor 620. Between the optical system 610 and the image sensor 620, a shutter screen 616 which is operated with the opening and shutting mechanism that is not illustrated is provided.

The image sensor 620 as a color image sensor mentioned in the Claims is an imaging element which comprises a photoelectric conversion element constituting a pixel positioned discretely in two-dimensional space and a charge-transfer device such as a CCD (Charge Coupled Device). The image sensor 620 is a so-called a CCD color image sensor or a CMOS color image sensor. The image sensor 620 is driven by a sensor controller which is not illustrated. The image sensor 620 accumulates electric charge, which is obtained by photoelectric conversion of the subject image imaged by the optical system 610, in every pixel in a fixed time period, and outputs an electrical signal in response to a received amount of light in every pixel. The image sensor 620 can take color image information by providing one of four color filters of C (Cyan), M (Magenta), Y (Yellow), and G (Green), or one of three color filters of R (Red), G (Green), and B (Blue) on the receiving surface. These color filters are arranged on the receiving surface of the image sensor 620 in a regulated manner. An exposure of the image sensor 620 is decided by full-aperture time of a shutter screen 616 and an aperture area of the aperture 614. In addition, the exposure time of the image sensor 620 may be adjusted by controlling the accumulation time of the electric charge itself of the image sensor 620 electrically.

An analog front end (AFE) 622 as an output unit mentioned in the Claims converts an electrical signal outputted from the image sensor 620 into a digital signal by an AD converter, and outputs the digital signal. Concretely, for example, the AFE 622 performs the CDS (Correlated Double Sampling) processing that is a reduction processing of noise included in an electrical signal, an optical black clamp to reproduce a black level of an image, a level control of an image signal by a gain control of an electrical signal, quantization, and outputs the digital image signal to digital image processing part 624.

When a RAW format is selected by a conversion setting which will be mentioned later, the AFE 622 just outputs the output signal of the image sensor 620 which is simply AD converted to an external memory 628. Generally, RAW data is data in which an electrical signal outputted from an image pickup device is digitized simply. In a file of RAW data, a format and a number of bits of the gray scale can be decided freely. It is not like JPEG data which is decided by an international standard. In an image file of a RAW data format of this embodiment, as well as imaging information that has been produced in a camera at the time of imaging, an image size, the number of the bits showing gray scale per one pixel, and a color filter arrangement information of a sensor, data in which the output signal of the image sensor 620 is digitally converted by AFE 622 are recorded. Data part of the output from the sensor which is recorded in the file of the RAW format (data in which an output signal from the image sensor 620 is simply digitally converted) is called RAW data in the present embodiment.

Digital image processor 624 as an output unit mentioned in the Claims performs image forming processing, white balance correction, gamma correction, and color space conversion that converts from an RGB color space to a YCbCr color space for the digital image signal outputted from the AFE 622.

The image forming processing is a process to generate light and shade level information of three primary colors of R, G, and B at every focused pixel based on one color of light and shade level outputted from a focused pixel of the image sensor 620 and light and shade levels of a plurality of colors outputted by a plurality of pixels of the vicinity, and repeats the process while moving the focused pixel. With this kind of image forming processing, a color image in which all pixels each have light and shade level information of R, G, and B is formed.

White balance correction is a processing that corrects a color tone of an image according to a color temperature of a light source by multiplying a correction coefficient set by every channel to light and shade level of each channel of all pixels. The correction coefficient that is a processing condition of white balance correction is set according to a kind of light source of the imaging environment set by a user. Fine weather, a cloudy sky, shade, a fluorescent lamp, and an incandescent lamp can be selected as the light source setting. In addition, an automatic setting as the light source setting can be made selectable, and when the automatic setting is selected, the correction coefficient is set automatically by analyzing the image.

A data format converter 626 as an output unit mentioned in the Claims converts a data format outputted from the digital image processor 624 or the external memory 628. The data format converter 626 performs, concretely, for example, compression or extension by the JPEG method that is an irreversible compression method or compression or extension by a reversible compression method that is not accompanied by truncating data. In addition, the data format converter 626 is configured to be able to perform conversion and reverse conversion to image data of a TIFF format in which data is not compressed. A data size of an image after conversion of a data format changes depending on a conversion method selected as a processing condition. By compression of the JPEG method, a data size of an image after conversion relates to a step width of a quantization step when a DCT coefficient is quantized. The data size of the image after compression is small and deterioration of the image by the compression becomes remarkable as the step width of the quantization step becomes large. By storing the width of the quantization step on a table for every compression quality, a user can select a table to use for quantization depending on a conversion setting to select. The RAW format, the TIFF format, high compression of the JPEG method, and low compression of the JPEG method can be selected for the conversion setting.

The external memory 628 as an output unit mentioned in the Claims comprises a card slot to connect a removable memory 630, and a memory controller. The external memory 628 is controlled by a control part 642, and the external memory 628 performs a processing to write the image data converted by the data format conversion part 626 or the RAW data outputted from the AFE 622 into the removable memory 630 and a processing to read image data stored in the removable memory 630.

A screen display 634 comprises a display controller controlling an LCD 662 (refer to FIG. 16A) and an LCD 662. The screen display 634 is controlled by the control part 642, and the screen display displays an image stored in the removable memory 630 and various menus based on data for screen display stored in a RAM 632 on the LCD 662.

A needle indication part 636 has three indication needles indicating the light source setting to be used for white balance correction, the conversion setting, and the remaining quantity of the battery which is not illustrated, and a drive circuit. An operation part 637 comprises a plurality of push button switches, a lever, and a jog dial to operate the DSC 601. The details of the needle indication part 636 and the operation part 637 will be described later.

The control part 642 as a first setting unit and a second setting unit mentioned in the Claims comprises a CPU 638, a flash memory 640, the RAM 632 as a memory unit, and an input-output interface which is not illustrated. The CPU 638 controls the whole of the DSC 601 by carrying out a program stored in the flash memory 640. The flash memory 640 is a nonvolatile memory storing various programs and data. Various programs and data to be stored in the flash memory 640 may be downloaded from a predetermined server through a network, or may be read from a storage medium that is able to be read from a computer such as a removable memory. The RAM 632 is a memory to store various programs and data temporarily. The input-output interface that is not illustrated is a circuit to convert data stored in the RAM 632 into a signal controlling a hardware of the image sensor 620, and converts a signal outputted from the operation part 637 into data which is able to be processed by the CPU 638.

The appearance of the DSC 601 will be described next.

Figure 16A:
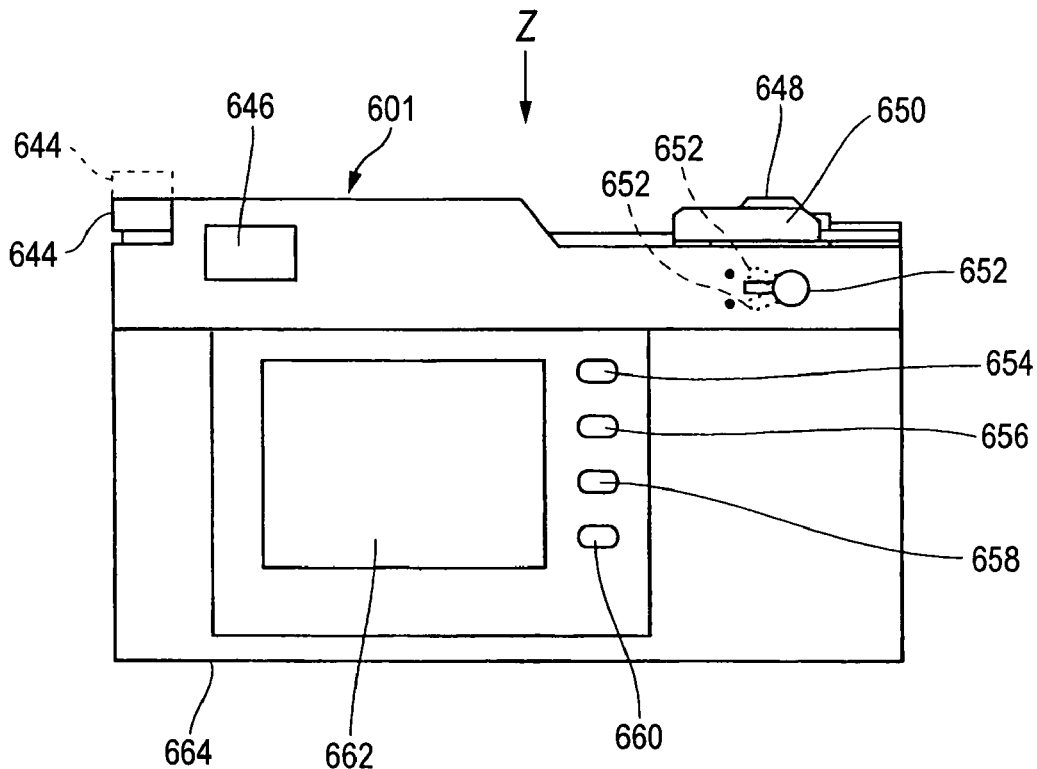
FIG. 16A is a back view of the digital camera according to the second embodiment of the present invention.
Figure 16B:
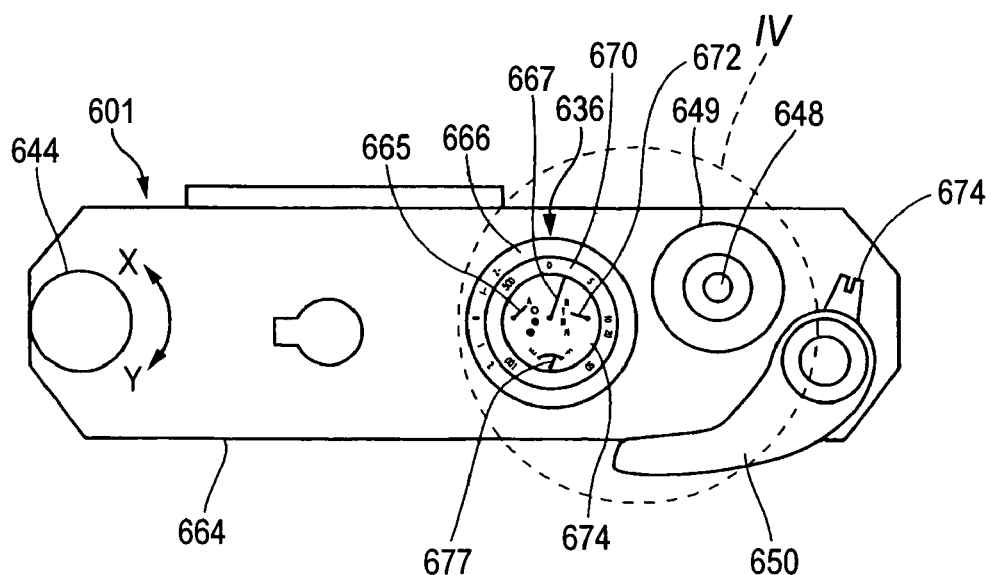
FIG. 16B is a top view of the digital camera according to the second embodiment of the present invention.

FIG. 16A is a rear view of the DSC 601, and FIG. 16B is a top view of the DSC 601 observed from a Z direction in FIG. 16A.

An optical finder 646 is used for a user to view the subject.

A power switch 674 is a switch to start or stop the DSC 601. A display switch 654, a menu switch 656, an enter switch 658, and a cancel switch 660 are push button switches to operate a menu displayed on the LCD 662.

A jog dial 644 as a first switch mentioned in the Claims is the switch which can rotate to operate a menu and light source setting and conversion setting displayed to LCD 662. The jog dial 644 can rotate in an XY direction and can move in an axial direction of the rotate. The jog dial 644 can rotate at two positions of the axial direction. In the description as follows, a position that is near to a housing 664 of the DSC 601 is called a lower position, and a position in which the jog dial 644 is lifted up from the lower part is called an upper position. A jog dial 644 in the lower position is shown by a solid line, and a jog dial 644 in the upper position is shown by a dashed line in FIG. 16A.

A lever 652 as a second switch mentioned in the claims is a switch which can rotate to select a photograph mode and a first setting mode and a second setting mode. The DSC 601 shifts to the photograph mode, the first setting mode or the second setting mode depending on a posture select of the lever 652. When the jog dial 644 rotates in the first setting mode, the control part 642 changes a light source setting according to the rotation angle of the jog dial 644 regardless of whether the position of the jog dial 644 is at the upper or the lower position. When the jog dial 644 rotates in the second setting mode, the control part 642 changes a conversion setting according to the rotation angle of the jog dial 644 regardless of whether the position of the jog dial 644 is at the upper or the lower position. By associating an intermediate posture (a level posture) of the lever 652 support with the photograph mode, the mode can be shifted from the photograph mode to both the first setting mode which can select the light source setting and the second setting mode which can select the conversion setting get possible to make direct shift possible are.

A film advance lever 650 is provided to perform a movement for raising the shutter screen 616 in the state that the shutter is released mechanically so that a next shutter movement becomes possible and for fixing the shutter screen 616 mechanically. The user performs a shutter charge by cocking the film advance lever 650 before photographing so that the shutter screen 616 is made possible for photographing. The dial switch 649 is a rotary switch to set a shutter speed and an ISO film speed. A shutter switch 648 is installed in a central part of the dial switch 649. When the shutter switch 648 is pushed down after the shutter charge is performed in the photograph mode, the control part 642 starts image processing.

Figure 17:
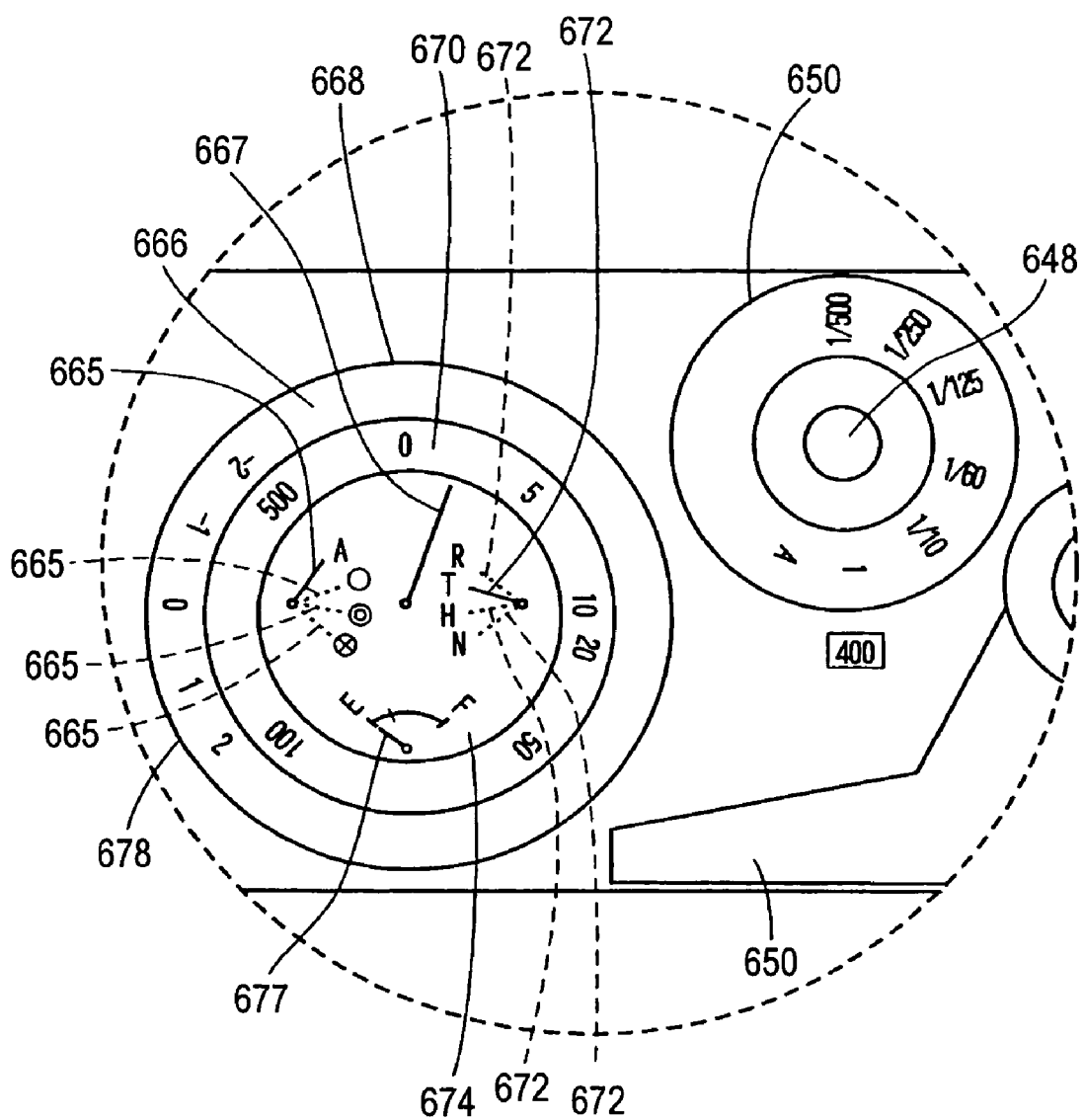
FIG. 17 is an enlarged view showing a IV part of FIG. 3.

The needle indication part 636 comprises a rotary dial 666, a letter ring 670, a dial 674, a light source setting indication needle 665, a conversion setting indication needle 672, a number of frames indication needle 667, and a remaining battery quantity indication needle 677 as shown in FIG. 17. The light source setting indication needle 665, the conversion setting indication needle 672, the number of the frames indication needle 667, and the remaining battery quantity indication needle 677 are driven to rotate by an actuator which is not illustrated of the needle indication part 636.

A symbol displayed on the dial 674, which the light source setting indication needle 665 as the first indication needle indicates, shows the light source setting currently set. The angle of the light source setting indication needle 665 is determined by controlling the actuator of the needle indication part 636 according to the light source setting currently set. The notation to show the light source setting may be a letter or a symbol. Concretely, for example, a letter showing an automatic setting, a circle showing sunlight, a double circle showing a fluorescent lamp, and a symbol showing an incandescent lamp are designated on the dial 674.

A letter designated on the dial 674, which the conversion setting indication needle 672 as the second indication needle indicates, shows the conversion setting currently set. The angle of the conversion setting indication needle 672 is determined by controlling the actuator of the needle indication part 636 according to the conversion setting currently set. The notation to show the conversion setting may be a letter or a symbol. Concretely, for example, a letter R showing the RAW format, a letter T showing the TIFF format, a letter H showing the JPEG format of high compression, and a letter N showing the JPEG format of low compression are written on the dial 674.

A number displayed on the letter ring 670, which the number of frames indication needle 667 indicates, shows an estimated number of the recordable frames with the conversion setting currently set. The angle of the number of frames indication needle 667 is determined by controlling the actuator of the needle indication part 636 according to the conversion setting currently set and the remaining capacity of the removable memory 630.

A part of an arc designed on the dial 674, which the remaining battery quantity indication needle 677 indicates, shows a current remaining battery quantity.

The rotary dial 666 is a rotary switch which can adjust an exposure value automatically set from −2 EV to +2 EV. The exposure value is set to the control part 642 according to the angle of the rotary dial 666.

Figure 18A:
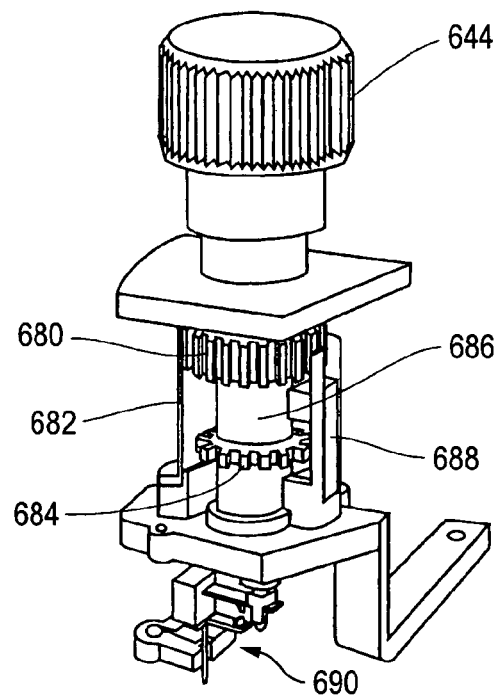
FIGS. 18A, 18B and 18C are perspective views showing a jog dial and its periphery according to the second embodiment of the present invention.
Figure 18B:
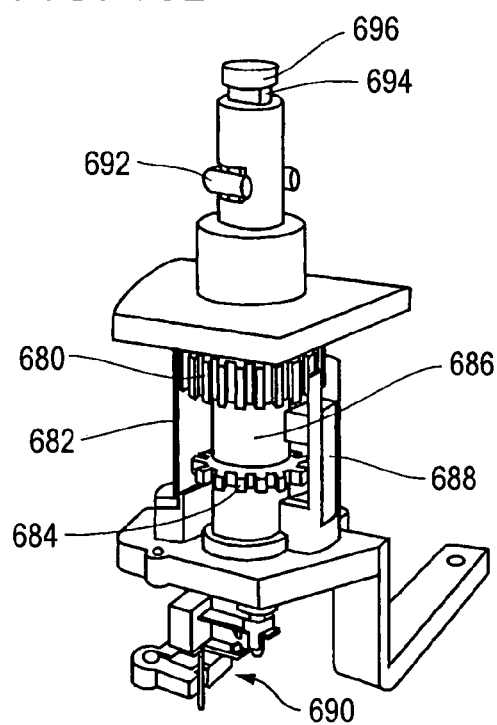
Figure 18C:
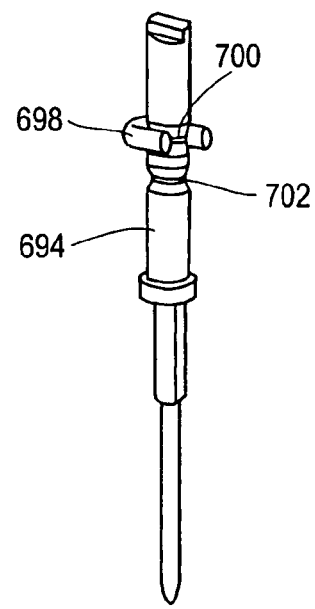

The jog dial 644 and the peripheral configuration are shown in FIG. 18. The jog dial 644 is connected to a shaft 694 by a connection member 696. The shaft 694 rotates with the jog dial 44 and moves in the axis direction that is a long distance direction of the shaft 694 with the jog dial 644. On an upper part of the shaft 694, annular grooves 700 and 702 are formed. When the shaft 694 moves in the axis direction with the jog dial 644, by fitting a clip 698 with a form of U-shaped character to annular grooves 700 and 702, the user operating the jog dial 644 senses that the jog dial 644 reached the upper position or the lower position. In addition, because the clip 698 has the elasticity, by fitting the clip 698 to the annular groove 700 or the annular groove 702 at the upper and lower position of the jog dial 644, the movement of the jog dial 644 moving in the axis direction can be regulated.

A cylinder cover 686 is connected to the shaft 694, and rotates with the shaft 694, and moves in the axis direction with the shaft 694. Gears 680 and 684 are installed on a rim of the cylinder cover 686. The gears 680 and 684 rotate with the cylinder cover 686, and move in the axis direction with the cylinder cover 686.

The gear 680 abuts a blade spring 682 when the gear 680 rotates with the jog dial 644 so that the user can get the feeling of a click when the user rotates the jog dial 644.

Quantity of rotate of the gear 684 installed on the same axis of the gear 680 is detected by a photo interrupter 690 by detecting the number of teeth or the number of the toothless section of the gear 684.

A leaf switch 690 is made on and off by the shaft 694 which moves in the axis direction with the jog dial 644, and detects whether the jog dial 644 is at the upper position or at the lower position.

Figure 14:
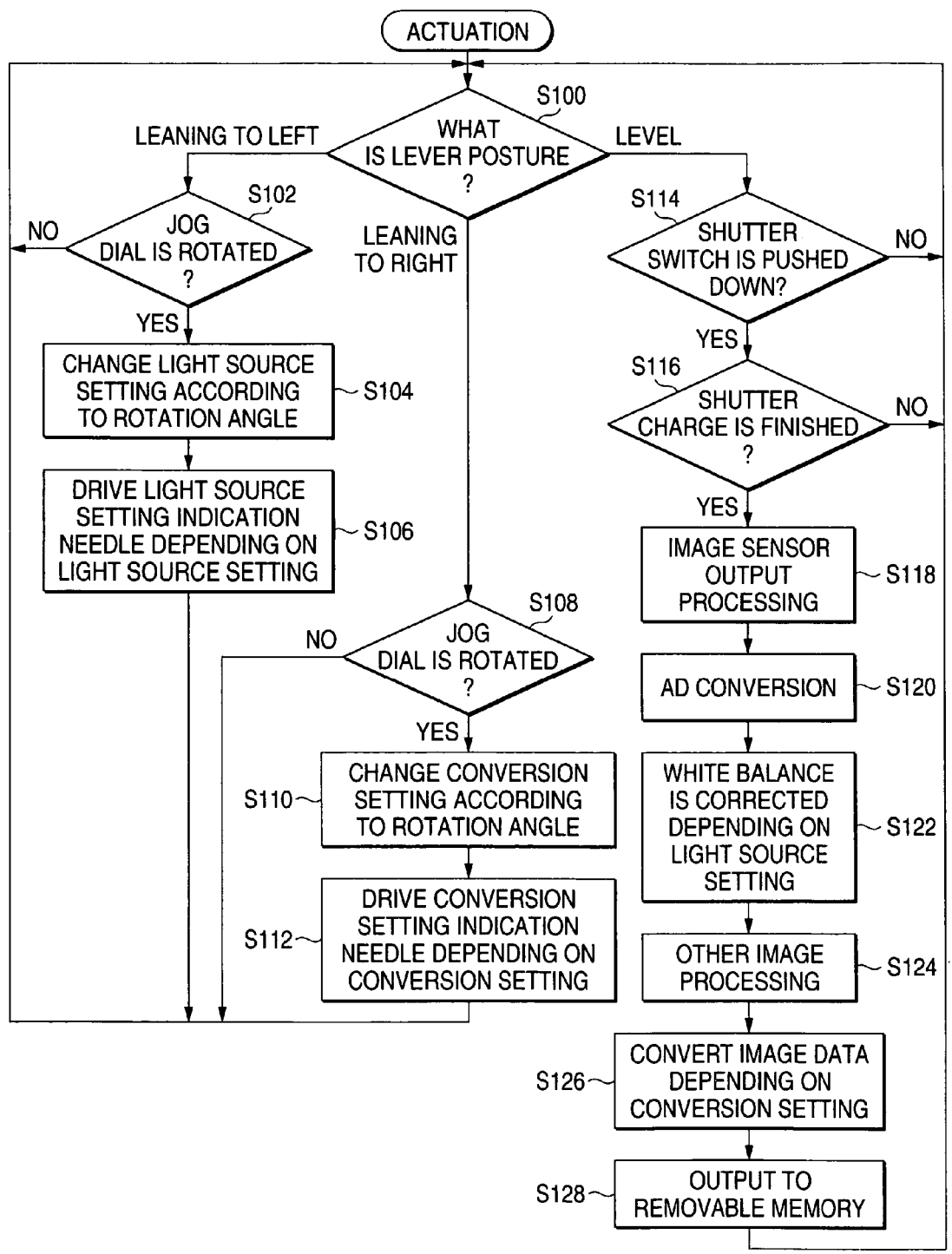
FIG. 14 is a flowchart showing an operation of a digital camera according to a second embodiment of the present invention.

The operation of the DSC 601 will be described based on FIG. 14 next. When the power switch 674 is operated and the DSC 1 is actuated, the DSC 601 operates as follows by a CPU 633 carrying out a control program stored in the flash memory 640.

First the control part 642 detects the posture of the lever 652, and the DSC 601 operates with each mode according to the posture of the lever 652 as follows (S100).

When the posture of the lever 652 is leaning to the left in the drawing of FIG. 16A, the control part 642 detects the rotation angle of the jog dial 644 based on an output signal of the photo interrupter 690 (S102). When the jog dial 644 is rotated, the control part 642 changes the light source setting according to the rotation angle (S104). Concretely, for example, a value of an address, which is referred to when a correction coefficient of white balance correction is set, is changed to a value according to the rotation angle. The control part 642 controls the actuator of the light source setting indication needle 665 depending on the light source setting next. The actuator rotates the light source setting indication needle 665 to an angle to indicate a symbol of the dial 674 showing the light source setting under control of the control part 642 (S106).

When the posture of the lever 652 is leaning to the right in the drawing of FIG. 16A, the control part 642 detects the rotation angle of the jog dial 644 based on an output signal of the photo interrupter 690 (S108) when the jog dial 644 is rotated, the control part 642 changes the conversion setting according to the rotation angle (S110). Concretely, for example, a value that is referred to when selecting a table in which the quantization step width of JPEG compression processing is described is changed to the value according to the rotation angle. The control part 642 controls the actuator of the conversion setting indication needle 672 depending on the conversion setting next. The actuator rotates the conversion setting indication needle 672 to an angle to indicate a symbol of the dial 674 showing the conversion setting under control of the control part 642 (S112).

When the posture of the lever 652 is level (an intermediate posture) in a drawing of FIG. 16B, the control part 642 detects an operation to push down the shutter switch 648 (S114). When the shutter switch 648 is pushed down, the control part 642 detects a state of a shutter charge (S116). If the shutter charge is finished, a shutter screen 616 is open for the time according to the shutter speed, and the control part 642 controls the image sensor 620 to output an electric charge accumulated in a photoelectric conversion element (S118). An output signal of the image sensor 620 is AD converted by the AFE 622 (S120) The digital image processor 624 performs the correction processing of the white balance according to the light source setting for the digital signal outputted from the AFE 622 (S122). The digital image processor 624 performs the gamma correction or other image processing for the digital signal outputted from the AFE 622 (S126). The data format conversion part 626 converts the data outputted from the digital image processor 624 depending on the conversion setting (S126). The external memory 628 lets the removable memory 630 store the image data outputted from the data format converter 626 (S128). In addition, the digital signal outputted from the AFE 622 is stored in the removable memory 630 when the conversion setting is a RAW data format as mentioned above.

According to the second embodiment of the present invention described above, by providing the lever 652 switching the photograph mode, the first setting mode setting the kind of light source deciding a correction coefficient of the white balance, the second setting mode setting the data conversion method relating to the data size of the image, the mode can be switched quickly from the photograph mode to modes frequently changed which are the mode which can set the white balance of the image and the mode which can set the data conversion method. In addition, by only a switching operation of the mode by the lever 652 and a rotating operation of the jog dial 644, the white balance and the data conversion method of the image which are changed frequently can be set quickly. In addition, by indicating the processing conditions of the white balance and the conversion method the images which are changed frequently with needles 665 and 672, visibility of a setting state of these processing conditions can be improved while reducing power consumption. In addition, because the lever 652 is used for the mode-switching operation, the user can recognize the mode by the posture of lever 652, and operability improves.

In the second embodiment, a configuration in which the mode can be changed from the photograph mode to the mode setting the white balance and the mode setting the data conversion method directly, there are two setting modes, and the setting contents can be changed by a rotate of the jog dial 644 is described. However, the present invention does not limit the modes to be switched to those two modes, nor limits setting items of which the setting contents can be changed by a rotate of the jog dial 644 to a white balance and a data conversion method. Concretely, for example, the photograph mode and the mode which sets the white balance and the mode which sets the exposure correction may be switched with the lever 652, or the photograph mode and the mode which sets the data conversion method and the mode which sets the exposure correction may be switched with the lever 652, or the number of the modes which can be switched with the lever 652 may be limited to two, or may be expanded to more than three.

In the second embodiment, the photograph mode, the mode setting the white balance, and the mode setting the data conversion method are switched with the lever 652. However, the present invention does not limit a configuration of the mode-switch switch to the lever. Concretely, for example, the modes may be switched with a push button switch which a mode circulates whenever the switch is pushed, or a push button switch may be provided for every mode when a mode is switched with such a push button switch, it is desirable to display the mode with an indicator such as an LED (Light Emitting Diode).

In the second embodiment, the processing condition which relates to the size of the image data is set by changing the conversion setting. However, the present invention does not limit the setting item of the processing condition which relates to the size of the image data to the conversion setting. Concretely, for example, a pixel size of the image maybe changed with the jog dial 644 in the second setting mode.

What is claimed is:

1. A digital camera comprising:

a color image sensor;

an optical system that forms an image of a subject on the color image sensor;

a rotatable first switch;

a second switch that switches a photograph mode, a first setting mode, and a second setting model, the second switch being a lever adapted to indicate an intermediate point corresponding to the photograph mode, a first point corresponding to the first setting mode, or a second point corresponding to the second setting mode, the intermediate point arranged between the first point and the second point;

a first setting unit that sets a first processing condition relating to a white balance of an image according to a rotation angle of the first switch in the first setting mode;

a second setting unit that sets a second processing condition relating to a data size of an image according to a rotation angle of the first switch in the second setting mode;

a first indication needle that indicates the first processing condition;

a second indication needle that indicates the second processing condition; and processing unit that processes an output signal of the color image sensor according to the first processing condition and the second processing condition in the photograph mode.

* * * * *